United States Patent [19]
Mizuta et al.

[11] Patent Number: 5,617,000
[45] Date of Patent: Apr. 1, 1997

[54] APPARATUS FOR DETECTING AND CONTROLLING THE ROTATIONAL POSITION OF A MOTOR SHAFT

[75] Inventors: Ken Mizuta, Miyagi-ken; Toshihiko Kawata, Sendai; Ken Shibazaki; Yukio Miura, both of Furukawa, all of Japan

[73] Assignee: Alps Electric Co., Ltd., Tokyo, Japan

[21] Appl. No.: 421,717

[22] Filed: Apr. 13, 1995

[51] Int. Cl.⁶ .................................................. B60N 2/06
[52] U.S. Cl. .............................................. 318/663; 318/661
[58] Field of Search ....................................... 318/138, 139, 318/245, 254, 439, 430, 431, 599, 640, 603, 663, 660–615, 624; 388/934, 811

[56] References Cited

U.S. PATENT DOCUMENTS

| | | | |
|---|---|---|---|
| 3,657,623 | 4/1972 | Fludzinski | 318/326 |
| 3,803,473 | 4/1974 | Stich | 318/341 |
| 3,894,347 | 7/1975 | Sleven et al. | 35/10.4 |
| 3,943,510 | 3/1976 | Orton | 343/7 A |
| 4,211,961 | 7/1980 | Marumoto et al. | 318/139 |
| 4,221,543 | 9/1980 | Cosentino et al. | 417/22 |
| 4,221,998 | 9/1980 | Haught et al. | 318/661 |
| 4,316,668 | 2/1982 | Miller | 355/55 |
| 4,484,122 | 11/1984 | Day et al. | 318/663 |
| 4,794,312 | 12/1988 | Kano et al. | |
| 5,122,720 | 6/1992 | Martinson et al. | 318/663 |
| 5,125,067 | 6/1992 | Erdman | 388/934 |
| 5,152,308 | 10/1992 | Koch | 137/1 |
| 5,227,704 | 7/1993 | Erdman | 318/254 |
| 5,270,631 | 12/1993 | Takahashi et al. | 318/135 |
| 5,376,866 | 12/1994 | Erdman | 318/254 |

FOREIGN PATENT DOCUMENTS 38214  10/1981  European Pat. Off. .

*Primary Examiner*—Paul Ip
*Attorney, Agent, or Firm*—Guy W. Shoup; Patrick T. Bever

[57] ABSTRACT

An apparatus for detecting and controlling the rotational position of a motor without using a high-priced component and without requiring special software processing. The apparatus includes a motor rotation control section for selectively connecting a power source to the motor to rotate the motor into a predetermined position, a potentiometer mechanically linked to a shaft of the motor to read the absolute rotational position of the motor, an astable multi-vibrator for generating output pulses having a duty ratio corresponding to the position read by the potentiometer, and a control signal generation section for supplying a control signal corresponding to the duty ratio of the output pulses to the motor rotation control section to control the rotational position of the motor.

9 Claims, 3 Drawing Sheets

FIG.3  *PRIOR ART*
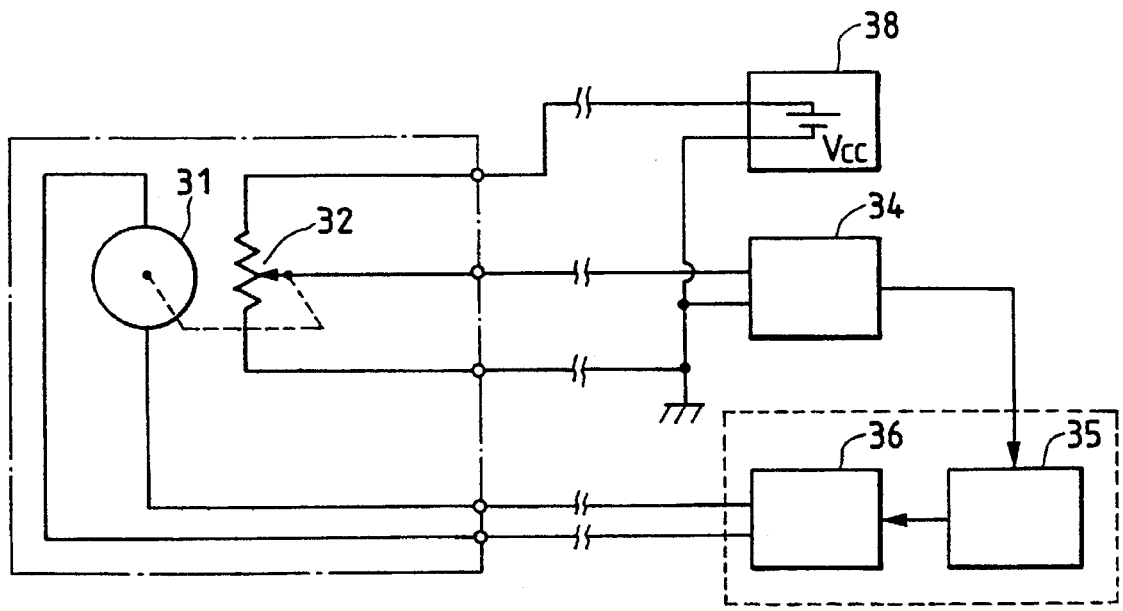
FIG.4  *PRIOR ART*
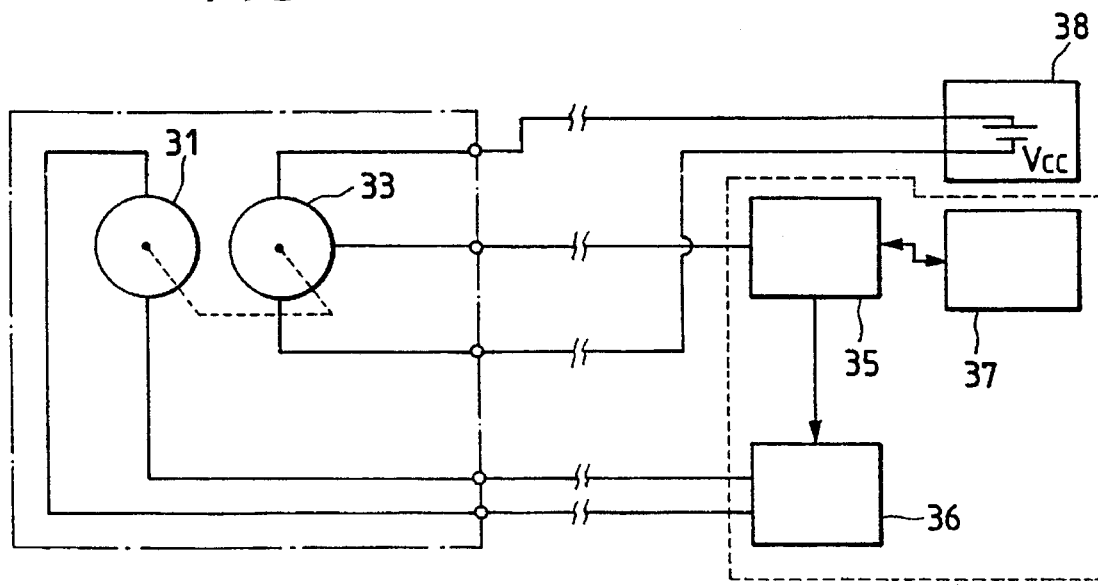

5,617,000

1

APPARATUS FOR DETECTING AND CONTROLLING THE ROTATIONAL POSITION OF A MOTOR SHAFT

BACKGROUND OF THE INVENTION

1. Field of the Invention

This invention relates to an apparatus for detecting the position of a motor-controlled mechanism and, more particularly, to a position detecting apparatus for detecting and controlling the rotational position of a motor associated with, for example, a power mirror assembly or a power seat assembly of a motor vehicle.

2. Description of the Related Art

Recent motor vehicles have been equipped with motor-controlled mechanisms, such as power mirrors and power seats, which are automatically adjusted to a predetermined position based on information stored in memory. To execute this automatic adjustment, a control apparatus is used which includes a position detector to determine the position of, for example, a seat or a mirror, by determining the rotational position of a motor associated with the motor-controlled mechanism. The rotational position of the motor is then compared with a stored position value, and the motor-controlled mechanism is then adjusted.

One of two prior art apparatus are typically used to adjust the above-mentioned motor-controlled mechanisms. A first prior art apparatus includes a potentiometer attached to the rotating shaft of a motor. The first prior art apparatus detects a change in the angle of rotation of the motor shaft by detecting a change in the resistance of the potentiometer. The first prior art apparatus controls the angle of rotation of the motor by generating a control signal corresponding to the resistance of the potentiometer. A second prior art apparatus includes a rotary encoder attached to the rotating shaft of the motor. The second prior art apparatus counts the number of output pulses generated by the rotary encoder, which in turn indicate the rotational speed of the motor when the motor shaft rotates. The second prior art apparatus then controls the angle of rotation of the motor by generating a control signal corresponding to the detected number of pulses.

FIG. 3 is a schematic diagram of the configuration of an example of the first prior art apparatus, and FIG. 4 is a schematic diagram of the configuration of an example of the second prior art apparatus.

Referring to FIG. 3, the first prior art apparatus includes is associated with a motor 31 which is operated to adjust a motor-controlled mechanism, such as a power mirror assembly or a power seat assembly of a motor vehicle, into a predetermined position. The apparatus includes a potentiometer 32 having a rotor mechanically linked to the rotating shaft of the motor 31. A moving contact connected to the rotor is electrically connected to an input terminal of an analog-digital converter 34. An output terminal of the analog-digital converter 34 is connected to an input terminal of a control signal generation section 35, and an output terminal of the control signal generation section 35 is connected to an input terminal of a motor rotation control section 36. An output terminal of the motor rotation control section 36 is connected to the terminals of the motor 31. A power source 38 applies a power supply voltage Vcc across the resistor of the potentiometer 32. The output (divided) voltage of the potentiometer 32 is typically being between 0 volts and Vcc, and is determined by the rotational position of the rotor (movable contact) relative to the resistor of the potentiometer 32. Because the rotor is mechanically linked to the motor shaft, the divided voltage indicates the angle of rotation of the motor 31. That is, the divided voltage received by the analog-digital converter 34 is proportional to the angle of rotation (rotational position) of the motor 31, thereby making it possible to determine the angle of rotation (position) of the motor 31 from the divided voltage. In the above-described arrangement, the motor 31 and the potentiometer 32 (located in the block indicated by the dot-dash line in FIG. 3) are integrally combined to form a unit in the vicinity of the motor 31. The control signal generation section 35 and the motor rotation control section 36 are integrally combined to form a micro control unit (MCU).

Referring to FIG. 4, the second prior art positioning apparatus is associated with a motor 31 operated to adjust a motor-controlled mechanism, such as a power mirror assembly or a power seat assembly of a motor vehicle, into a predetermined position. The second prior art apparatus includes a rotary encoder 33 having a rotor mechanically linked to the rotating shaft of the motor 31, and the rotary encoder 33 includes a detector which is electrically connected to an input terminal of a control signal generation section 35. A storage section 37 is connected to the control signal generation section 35. An output terminal of the control signal generation section 35 is connected to an input terminal of a motor rotation control section 36. An output terminal of the motor rotation control section 36 is connected to the motor 31. A power source 38 is connected between two terminals of the rotary encoder 33. In this case, since the rotor of the rotary encoder 33 is connected to the rotating shaft of the motor 31, the number of output pulses generated by the rotary encoder 33 is proportional to the rotational speed and the angle of rotation of the motor shaft of the motor 31, and the period of the output pulses is also proportional to the rotational speed and the angle of rotation of the motor shaft. That is, the number and the period of output pulses generated by the detector of the rotary encoder 33 represent the rotational speed and the rotating direction of the motor 31, and it is therefore possible to determine the rotational position of the motor 31 from these pulses. In the above-described arrangement, the motor 31 and the rotary encoder 33 (in the block indicated by the dot-dash line in FIG. 4) are integrally combined to form a unit in the vicinity of the motor 31. The control signal generation section 35, the motor rotation control section 36 and the storage section 37 are integrally combined to form a micro control unit (MCU).

Use of the above-mentioned first and second prior art apparatus will now be described.

In the first prior art apparatus, when a driver of the motor vehicle operates an appropriate operating button or operating lever to adjust the motor-controlled mechanism (e.g. a power mirror, a power seat or the like), a drive command is sent from the control signal generation section 35 to the motor rotation control section 36. In response to this drive command, the motor rotation control section 36 supplies a driving current to the motor 31, thereby causing the motor to rotate. When the motor 31 rotates in response to the driving current, the rotor of the potentiometer 32, which is linked to the rotating shaft of the motor 31, also rotates, and the divided voltage corresponding to the angle of rotation of the motor 31 is obtained through the rotor. Next, this divided voltage is converted into a digital signal by the analog-digital converter 34, and the converted digital signal is supplied to the control signal generation section 35. The control signal generation section 35 compares the digital signal with stored position information and generates a control signal corresponding to a difference between the digital signal and the stored information, and then transmits the control signal to the motor rotation control section 36. The motor rotation control section 36 continuously drives the motor 31 in accordance with the control signal, and maintains the driving operation until the angle of rotation (position) of the motor 31 becomes equal to a predetermined angle (position), thus moving the moving mechanism (for example, a mirror of a power mirror assembly or a seat of a power seat assembly) to a predetermined position.

In the second prior art position detector, when a driver of the motor vehicle operates an appropriate operating button or operating lever to adjust the motor-controlled mechanism, a drive command is sent from the control signal generation section 35 to the motor rotation control section 36. In response to this drive command, the motor rotation control section 36 supplies a driving current to the motor 31, thereby causing the motor 31 to rotate. When the motor 31 rotates in response to the supplied driving current, the rotor of the rotary encoder 33 linked to the rotating shaft of the motor 31 also rotates, and a pulse signal corresponding to the rotational speed and the rotational position of the motor 31, i.e., a pulse signal (position information) having a number of pulses and a pulse period representing the rotational speed and the rotational distance of the motor 31, is generated by the rotary encoder 33. Then this pulse signal (position information) is supplied to the control signal generation section 35 for comparison with previously-received position information and predetermined position information stored in the storage section 37. The control signal generation circuit 35 generates a control signal corresponding to the result of this comparison and supplies this signal to the motor rotation control section 36. The motor rotation control section 36 continuously drives the motor 31 at a rotational speed determined in accordance with the control signal, and controls the driving operation until the angle of rotation (position) of the motor 31 becomes equal to a predetermined angle (position), thus moving the movable mechanism, for example, a mirror of a power mirror assembly, a seat of a power seat assembly or the like, to a predetermined position.

The first prior art position detector has an advantage over the second prior art apparatus in that the divided voltage obtained from the potentiometer 32 represents an absolute position of the motor 31. However, the first prior art apparatus requires a high-priced analog-digital converter 34 for converting the divided voltage into a digital signal because the voltage value, in order to be processed by the MCU, which must be converted into a digital form.

On the other hand, the second prior art position detector has an advantage over the first prior art apparatus in that the MCU of the second prior art apparatus is capable of directly processing the pulse signal generated by the rotary encoder 33 in a digital processing manner. However, the second prior art apparatus requires the use of storage section 37 for storing the absolute position of the motor 31, and must recalculate the absolute position each time the motor 31 is driven to rotate. This is required because the pulse signal generated by the rotary encoder 33 only designates a relative rotational position of the motor 31. The absolute position must be calculated by determining the angular displacement from the previously-calculated absolute position stored in the storage section 37, which is determined by the number of pulses obtained from the rotary encoder 33. Therefore, the second prior art apparatus requires an expensive device acting as the storage section 37. Also, it is necessary to a special MCU and processing software to process the pulse signal and the memory content of the storage section 37 to calculate the absolute rotational position of the motor 31.

SUMMARY OF THE INVENTION

In view of the above-described problems, an object of the present invention is to provide a position detecting apparatus capable of determining the absolute rotational position of a motor without requiring high-priced components and without requiring special processing software.

In accordance with a first aspect the present invention, a detecting apparatus is provided for determining the absolute rotational position of a motor associated with a motor-controlled mechanism, such as a power seat assembly or a power mirror assembly. The detecting apparatus includes a detector, such as a potentiometer, which is mechanically linked to the motor shaft of the motor, and which generates a position signal having a voltage level determined by an absolute rotational position of the motor shaft. The detecting apparatus also includes a pulse generating circuit, such as an astable multivibrator, which is connected to the detector and generates a pulse signal having a duty ratio determined by the voltage level of the position signal. Because the duty ratio of the pulse signal can be directly applied to a micro control unit (MCU), it is possible to generate absolute rotational position information without the use of an analog-to-digital converter or a special MCU capable of storing absolute position information, as required in the prior art.

In accordance with a second aspect of the present invention, the detecting apparatus is powered entirely from drive signals applied to the motor through a rectifying circuit. This further reduces the cost of the detecting apparatus by eliminating the need for a separate power source, as required in the prior art.

In accordance with a third aspect of the present invention, a control apparatus is provided for adjusting the rotational position of a motor. The control apparatus includes the detector and pulse generating circuit described above, and further includes a control circuit which measures the duty ratio of the pulse signal, compares the measured duty ratio with a predetermined value, and transmits a drive signal to the motor in response to a difference between the measured duty ratio and the predetermined value.

In accordance with another aspect of the present invention, a method is provided for controlling the rotational position of a motor. The method first applies a first drive signal to the motor such that the motor shaft is rotated, then detects an absolute rotational position of the rotated motor shaft and generates a position signal whose voltage level is proportional to the absolute rotational position. This position signal is then converted into a pulse signal including at least one pulse having a duty ratio which is proportional to the voltage level of the position signal. The duty ratio of the pulse signal is then compared with a stored value which representing a predetermined rotational position of the motor shaft. Finally, a second drive signal is transmitted to the motor which drives the motor toward the predetermined position. This process is repeated until the duty ratio of the pulse signal coincides with the predetermined value.

BRIEF DESCRIPTION OF THE DRAWINGS

FIG. 3 is a diagram of the configuration of an example of a first prior art position detecting apparatus using a potentiometer;

FIG. 4 is a diagram of the configuration of an example of a second prior art position detecting apparatus using a rotary encoder.

DESCRIPTION OF THE PREFERRED EMBODIMENT

The preferred embodiment of the present invention will be described below in detail with reference to FIGS. 1, 2A, 2B and 5.

Figure 1:
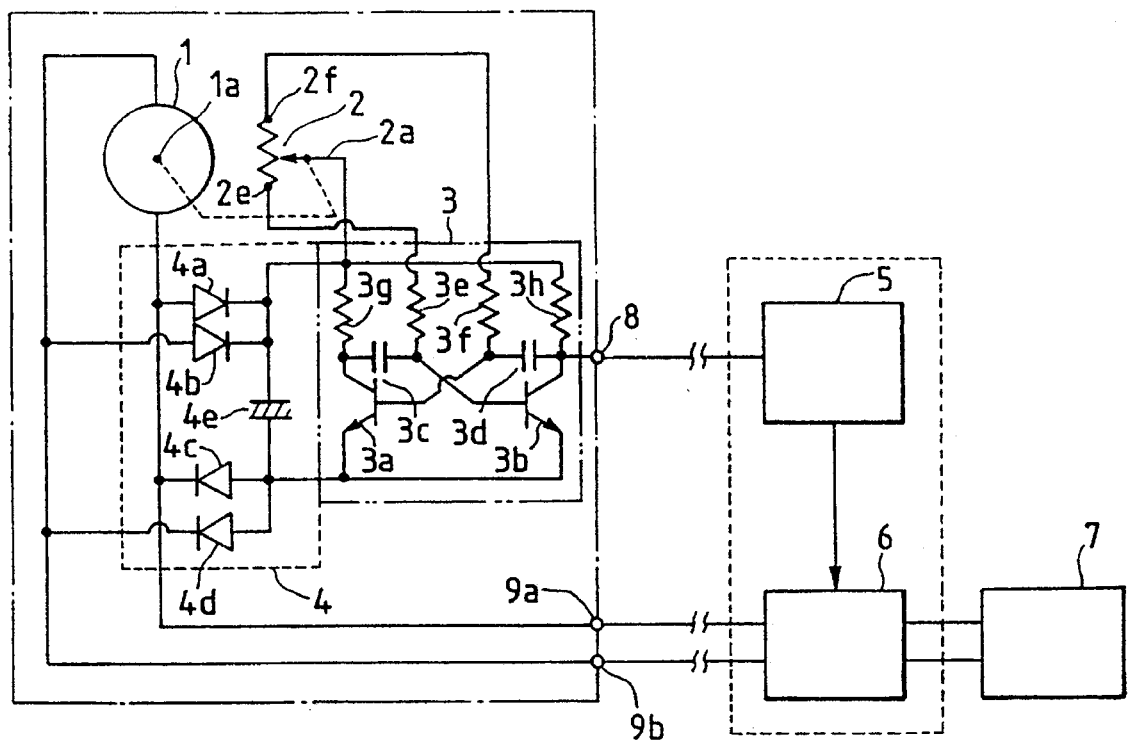
FIG. 1 is a diagram showing an embodiment of an apparatus for detecting the position of a rotating mechanism in accordance with the present invention.

FIG. 1 shows an example of an apparatus for detecting and controlling the position of a rotating mechanism, such as a motor, in accordance with the present invention. The apparatus detects the absolute rotational position of the motor shaft and generates control signals for adjusting a motor-controlled mechanism (such as a power mirror assembly or a power seat assembly of a motor vehicle) to a predetermined position.

Figure 5:
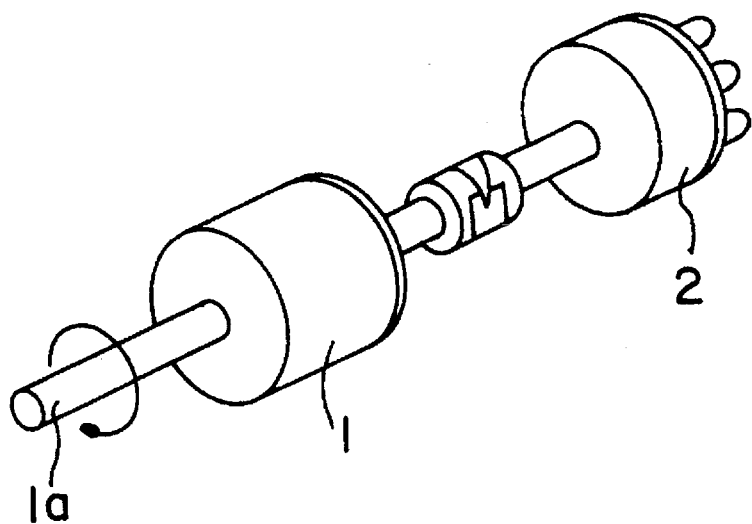
FIG. 5 is a perspective view of a general rotational position detecting apparatus using a potentiometer.

Referring to FIG. 1, in accordance with a first aspect of the present invention, the apparatus includes a motor (rotating mechanism) having a motor shaft 1a which is connected to a motor-controlled mechanism, as shown in FIG. 5. A movable element (such as a rotor) 2a of a variable resistor device (such as a potentiometer) 2 is mechanically linked to the motor shaft 1a such that rotation of the motor shaft 1a causes an associated rotation (or movement) of the rotor 2a, thereby causing the potentiometer 2 to generate a position signal having a voltage level which is related to the absolute angular (rotational) position of the motor shaft 1a. This position signal is transmitted to an astable multivibrator (pulse generating circuit) 3, which in turn generates a pulse signal whose duty ratio is determined by the voltage level of the position signal.

In accordance with a second aspect of the present invention, the apparatus further includes a rectifying circuit 4 connected between the terminals of the motor 1 and the astable multivibrator 3 (and potentiometer 2). The rectifying circuit 4 transmits a portion of the drive signal, which is applied to the motor 1, to the astable multivibrator 3 and the potentiometer 2. This eliminates the need for a separate power supply for driving the astable multivibrator 3 and the potentiometer 2.

In accordance with a third aspect of the present invention, the apparatus further includes a micro control unit (MCU) which includes a control signal generation circuit 5 and a motor drive signal generating circuit 6. The control signal generating circuit 5 receives the pulse signal generated by the astable multivibrator 3, compares the duty ratio of the pulse signal with a predetermined value, and transmits a control signal to the motor drive signal generating circuit 6 in response to a difference between the duty ratio and the predetermined value. The motor drive signal generating circuit 6 then transmits a motor drive signal at power supply terminals 9a and 9b, which in turn causes the motor 1 to rotate. When the duty ratio of the pulse signal is equal to the predetermined value, the control signal transmitted to the motor drive signal generating circuit 6 is adjusted such that the motor 1 is turned off (i.e., the motor shaft 1a is not rotating).

Referring to FIG. 5, the rotor 2a is mechanically linked to the motor shaft 1a using a linkage such as a gear train or other mechanism. The rotor 2a includes a movable contact which slides on a resistor of the potentiometer 2. A first terminal 2e and a second terminal 2f of the potentiometer 2 are connected to opposite ends of the resistor. The linkage between the motor shaft 1a and the rotor 2a is arranged such that an absolute position of the motor 1 determines the position of the movable contact relative to the resistor, thereby determining the voltage level of the position signal. That is, the motor 1 typically rotates over a range bounded by, for example, the fully-forward and fully-back positions of a seat or the extreme adjustment positions of a side-view mirror. When the motor 1 is rotated to a first extreme of this range (e.g. when the seat is in its forward-most position), the linkage rotates the rotor 2a such that the movable contact is located, for example, at an end of the resistor adjacent terminal 2e. Similarly, when the motor 1 is rotated to a second extreme of this range (e.g., when the seat is in its fully-back position), the linkage rotates the rotor 2a such that the movable contact is located at an end of the resistor adjacent terminal 2f. Finally, when the absolute position of the motor 1 is somewhere between these extremes (e.g., when the seat is between the forward-most and fully-back positions), the movable contact is positioned proportionally between the terminals 2e and 2f.

The astable multivibrator 3 includes a first transistor 3a having a collector connected to the rotor (third terminal) 2a through a first resistor 3g, an emitter, and a base connected to the second terminal 2f of the potentiometer 2 through a second resistor 3f. The astable multivibrator 3 further includes a second transistor 3b having a collector connected to the rotor 2a through a third resistor 3h, an emitter tied to the emitter of the first transistor 3a, and a base connected to the second terminal 2f of the potentiometer 2 through a fourth resistor 3e. The collector of the first transistor 3a is connected to the base of the second transistor 3b through a first coupling capacitor 3c, and the collector of the second transistor 3b is connected to the base of the first transistor 3a through a second coupling capacitor 3d. The pulse signal output from the astable multivibrator 3 is generated from output terminal 8, which is located at the collector of the second transistor 3b.

The rectifying circuit 4 includes a first diode 4a having an anode connected to a first terminal of the motor 1, a second diode 4b having an anode connected to a second terminal of the motor 1, a third diode 4c having a cathode connected to the first terminal of the motor 1, and a fourth diode 4d having a cathode connected to the second terminal of the motor 1. Cathodes of the first diode 4a and the second diode 4b are directly connected between the rotor 2a of the potentiometer 2 and the first resistor 3g of the astable multivibrator 3. Anodes of the third diode 4c and the fourth diode 4d are directly connected to the emitters of the first transistor 3a and the second transistor 3b. A smoothing capacitor 4e is connected between the cathodes of the first and second diodes and the anodes of the third and fourth diodes. With this arrangement, the drive signal applied to the motor 1 is applied to the potentiometer 2 and the astable multivibrator 3 through the rectifying circuit 4.

The collector of the transistor 3b, i.e., the output terminal 8 of the astable multivibrator 3, is connected to an input terminal of the control signal generation circuit 5, and an output terminal of the control signal generation circuit 5 is connected to a control input terminal of the motor drive signal generating circuit 6. The motor drive signal generating circuit 6 includes input terminals connected to a power source 7 and output terminals connected to the motor 1 through the driving power supply terminals 9a and 9b.

In the above-described arrangement, the motor 1, the potentiometer 2, the multivibrator 3 and the rectifying circuit 4 (in the block indicated by the dot-dash line in FIG. 1) are integrated to form a unit in the vicinity of the motor 1, while the control signal generation circuit 5 and the motor drive signal generating circuit 6 are integrally combined to form a micro control unit (MCU).

The apparatus thus arranged operates as described below.

When a driver of the motor vehicle operates an associated operating button or operating lever to adjust a motor-controlled mechanism into a predetermined position, a drive command is sent from the control signal generation circuit 5 to the motor drive signal generating circuit 6. In response to this drive command, the motor drive signal generating circuit 6 supplies driving electric power to the motor 1. When driving electric power is supplied, the motor 1 rotates thereby, and driving electric power is also supplied to the astable multivibrator 3 through the rectifying circuit 4, whereby the astable multivibrator 3 begins to oscillate and to generate pulse signals. The period T of each pulse generated by the astable multivibrator 3 is expressed by the following equation:

$$T=0.69\{C1(R1+VR1)+C2(R2+VR2)\},$$

where the capacitance values of the coupling capacitors $3c$ and $3d$ are C1 and C2, respectively, the resistance values of the base resistors $3e$ and $3f$ are R1 and R2, respectively, the resistance value of the potentiometer 2 between the two opposite terminals is VR, the resistance value between the rotor $2a$ and the terminal of the potentiometer 2 connected to the base resistance $3e$ is VR1, and the resistance value between the rotor $2a$ and the terminal of the potentiometer 2 connected to the base resistance $3f$ is VR2 (i.e., VR1+VR2=VR).

The ON period Ton of output pulses generated by the astable multivibrator 3 is $0.69\{C1(R1+VR1)\}$ and the OFF period Toff is $0.69\{C2(R2+VR2)\}$ if the output pulses are output as a positive logic output from the collector of the transistor $3b$. Then, the duty ratio D is $$D=Ton/(Ton+Toff).$$

When the motor 1 rotates, the rotor $2a$ of the potentiometer 2 also rotates with the rotation of the motor 1. The resistance values VR1 and VR2 of the potentiometer 2 increase and decrease alternately according to the direction and the angle of rotation of the rotor $2a$, thereby causing the On period Ton and the OFF period Toff of output pulses to also increase and decrease alternately by the alternate increase and decrease in the resistance values VR1 and VR2.

Figure 2A:
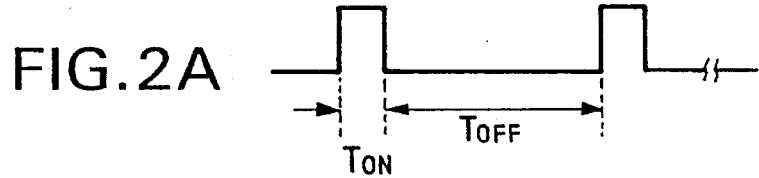
FIG. 2A is a signal waveform diagram showing an example of the state of output pulses obtained in the embodiment shown in FIG. 1.
Figure 2B:
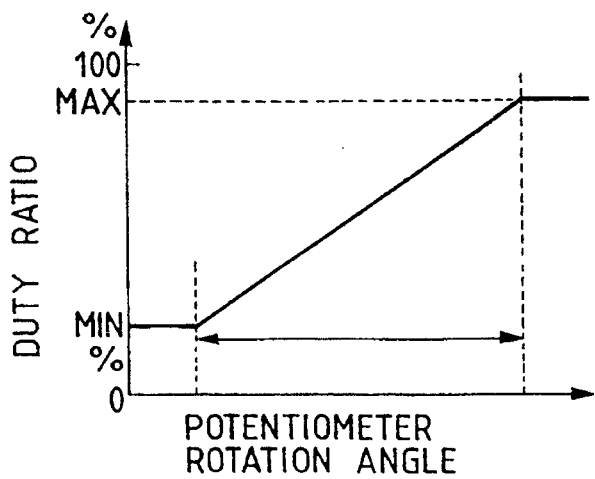
FIG. 2B is a characteristic diagram showing the relationship between the angle of rotation of a potentiometer and the duty ratio of output pulses.

FIG. 2A is a waveform diagram showing an example of the state of output pulses obtained in the embodiment shown in FIG. 1, and FIG. 2B is a characteristic diagram showing the relationship between the angle of rotation of the rotor $2a$ of the potentiometer 2 and the duty ratio.

As shown in FIG. 2A, output pulses have ON period Ton and OFF period Toff, and the period T is Ton+Toff. When the rotor $2a$ rotates in accordance with the rotation of the motor 1 to move toward the terminal $2e$, the resistance value VR1 is reduced while the resistance value VR2 is increased, so that the ON period Ton becomes shorter while the OFF period Toff becomes longer, thereby reducing the duty ratio D. Conversely, when the rotor $2a$ moves toward the terminal $2f$, the resistance value VR1 is increased while the resistance value VR2 is reduced, so that the ON period Ton becomes longer while the OFF period Toff becomes shorter, thereby increasing the duty ratio D.

As shown in FIG. 2B, the duty ratio D of output pulses changes substantially linearly with the change in the position (the angle of rotation) of the rotor $2a$ rotating in accordance with the motor 1. A minimum duty ratio Dmin is exhibited when the rotor $2a$ reaches the terminal $2e$ and when the resistance value VR1 becomes substantially zero. On the other hand, a maximum duty ratio Dmax is exhibited when the rotor $2a$ reaches the terminal $2f$ and when the resistance value R2 is substantially zero. The minimum duty ratio Dmin is not equal to 0%, but has a value close to zero because, when the minimum duty ratio Dmin is obtained, the resistance value R1 of the base resistor $3e$ still exists even though the resistance value VR1 becomes substantially zero. Similarly, the maximum duty ratio Dmax is not equal to 100%, but has a value close to 100% because, when the maximum duty ratio Dmax is obtained, the resistance value R2 of the base resistor $3f$ still exists even though the resistance value VR2 becomes substantially zero.

Output pulses generated by the astable multivibrator 3 are transmitted from the output terminal 8 to the control signal generation circuit 5. The control signal generation circuit 5 detects the duty ratio D (information content) of the supplied output pulses, compares the duty ratio with a predetermined duty ratio representing the desired position of the motor-controlled mechanism, and generates a control signal corresponding to the difference between the duty ratio received from the astable multivibrator 3 and the predetermined duty ratio. Then, the motor drive signal generating circuit 6 receives this control signal and outputs driving electric power to the motor 1 through the time period corresponding to the content of the control signal.

When the motor 1 rotates thereby, the rotor $2a$ of the potentiometer 2 also rotates with the rotation of the motor 1, and the astable multivibrator 3 is set in the operating state by the supply of driving electric power to the motor 1 to obtain output pulses having duty ratio D according to the rotational position of the rotor $2a$. Subsequently, the above-described operation is repeated.

By repeating the above-described operation, the angle of rotation (position) of the motor 1 is adjusted so as to become equal to a predetermined angle (position). That is, when the movable mechanism, i.e., a remote controlled mirror, a power seat adjuster or the like, is moved to the desired position, the control signal generation circuit 5 determines that the detected duty ratio is equal to the predetermined duty ratio, and transmits a control signal which causes the motor drive signal generating circuit 6 to stop the supply of driving power to the motor 1. At this time, the rotations of the motor 1 and the potentiometer 2 are also stopped by the stoppage of the supply of driving electric power, and the generation of output pulses is stopped by the stoppage of the operating power supply.

The scope of the present invention is not limited to the specific embodiment discussed above. For example, the present invention has been described with respect to an embodiment where the rotating mechanism is a motor. However, the rotating mechanism of the present invention is not limited to a motor. The present invention can also be applied in the same manner to any other electrically-driven rotatable mechanisms. Further, the present invention can be applied to motors for uses other than those discussed in examples, so long as the motor is operated by electric power to adjust the position of a movable part.

Further, in the above-described embodiment, the pulse generation circuit is disclosed as an astable multivibrator. However, the pulse generation circuit of the present invention is not limited to the astable multivibrator. The pulse generation circuit may be formed of any other circuit, e.g., a monostable multivibrator or the like, as long as the duty ratio of output pulses from the circuit can be changed with changes in resistance or voltage level.

In the above-described embodiment, the rotational position detector is a potentiometer. However, the rotational position detector of the present invention is not limited to the potentiometer, and any other variable resistor or the like, capable of detecting the absolute position of the motor when the motor rotates, may be used.

According to the present invention, described above, a movable part (rotor) of a rotational position detecting means (potentiometer) is linked to a rotating shaft of a rotating mechanism (motor), and the movable part (rotor) of the rotational position detecting means (potentiometer) is rotated with the rotation of the rotating mechanism (motor). Accordingly, an output read from the movable part (rotor) is obtained as information representing the absolute position of the angle of rotation (position) of the rotating mechanism (motor). There is therefore no need to provide a high-priced storage section in a micro control unit having a position control means (control signal generation section) and a rotating drive means (motor rotation control section), or to perform special software processing.

Also, according to the present invention, the rotational position detection means (potentiometer) is connected to a pulse generation circuit (astable multivibrator), the duty ratio of output pulses from the pulse generation circuit (astable multivibrator) is changed according to the output read from the movable part (rotor) of the rotational position detecting means (potentiometer), and the position control means (control signal generation section) generates a control signal corresponding to the duty ratio of the output pulses. Thus, it is possible to convert voltages (analog signal) obtained by the rotational position detecting means (potentiometer) into a digital signal only by using a simple pulse generation circuit (astable multivibrator) without an analog-digital converter.

Further, according to the present invention, the duty ratio of output pulses obtained by the pulse generation circuit (astable multivibrator) serves both as position information for detecting the position of the rotating mechanism (motor) and diagnosis information for determination as to whether the rotating mechanism (motor), the rotational position detecting means (potentiometer) and the pulse generation circuit (astable multivibrator) are operating normally. It is therefore possible to monitor the operation of the rotating mechanism position detecting apparatus by monitoring this duty ratio.

According to the present invention, it is also possible to obtain an effect of reducing the number of harness elements integrally provided on the rotating mechanism (motor) over known rotating mechanism position detecting apparatus.

What is claimed is:

1. An apparatus for detecting a rotational position of a motor shaft, the motor shaft being driven to rotate by a motor in response to a drive signal, the apparatus comprising:

a potentiometer having a rotor mechanically linked to the motor shaft for generating a position signal having a voltage level determined by an absolute rotational position of the motor shaft; and an astable multivibrator connected to the potentiometer for generating a pulse signal, the pulse signal including at least one pulse having a duty ratio determined by the voltage level of the position signal.

2. The apparatus of claim 1, wherein the potentiometer comprises a resistor and a movable contact mounted on the rotor, the movable contact slidably contacting the resistor, the potentiometer including a first terminal connected to a first end of the resistor, a second terminal connected to a second end of the resistor, and a third terminal connected to the movable contact.

3. The apparatus of claim 2, wherein the astable multivibrator comprises:

a first transistor having a collector connected to the third terminal through a first resistor, an emitter, and a base connected to the second terminal of the potentiometer through a second resistor; and a second transistor having a collector connected to the third terminal through a third resistor, an emitter connected the emitter of the first transistor, and a base connected to the second terminal of the potentiometer through a fourth resistor;

wherein the collector of the first transistor is connected to the base of the second transistor through a first capacitor, and the collector of the second transistor is connected to the base of the first transistor through a second capacitor; and wherein the pulse signal is generated from the collector of the second transistor.

4. The apparatus of claim 3, further comprising a rectifying circuit including:

a first diode having an anode connected to a first terminal of the motor;

a second diode having an anode connected to a second terminal of the motor;

a third diode having a cathode connected to the first terminal of the motor; and a fourth diode having a cathode connected to the second terminal of the motor;

wherein cathodes of the first and second diodes are connected to the third terminal of the potentiometer;

wherein anodes of the third and fourth diodes are connected to the emitters of the first and second transistors;

wherein the cathodes of the first and second diodes are connected to the anodes of the third and fourth diodes through a smoothing capacitor; and wherein the drive signal applied to the motor is applied to the potentiometer and the astable multivibrator through the rectifying circuit.

5. An apparatus for controlling a rotational position of a motor shaft, the motor shaft being driven to rotate by a motor in response to a drive signal, the apparatus comprising:

a potentiometer having a rotor mechanically linked to the motor shaft for generating a position signal having a voltage level determined by an absolute rotational position of the motor shaft;

an astable multivibrator connected to the potentiometer for generating a pulse signal, the pulse signal including at least one pulse having a duty ratio determined by the voltage level of the position signal;

a control circuit connected to the astable multivibrator for measuring the duty ratio of the pulse signal, and for transmitting a drive signal to the motor in response to the measured duty ratio.

6. The apparatus of claim 5, wherein the potentiometer comprises a resistor and a movable contact mounted on the rotor, the movable contact slidably contacting the resistor, the potentiometer including a first terminal connected to a first end of the resistor, a second terminal connected to a second end of the resistor, and a third terminal connected to the movable contact.

7. The apparatus of claim 6, wherein the astable multivibrator comprises:

a first transistor having a collector connected to the third terminal through a first resistor, an emitter, and a base connected to the second terminal of the potentiometer through a second resistor; and a second transistor having a collector connected to the third terminal through a third resistor, an emitter connected the emitter of the first transistor, and a base connected to the second terminal of the potentiometer through a fourth resistor;

wherein the collector of the first transistor is connected to the base of the second transistor through a first capacitor, and the collector of the second transistor is connected to the base of the first transistor through a second capacitor; and wherein the pulse signal is generated from the collector of the second transistor.

8. The apparatus of claim 7, further comprising a rectifying circuit including:

a first diode having an anode connected to a first terminal of the motor;

a second diode having an anode connected to a second terminal of the motor;

a third diode having a cathode connected to the first terminal of the motor; and a fourth diode having a cathode connected to the second terminal of the motor;

wherein cathodes of the first and second diodes are connected to the third terminal of the potentiometer;

wherein anodes of the third and fourth diodes are connected to the emitters of the first and second transistors;

wherein the cathodes of the first and second diodes are connected to the anodes of the third and fourth diodes through a smoothing capacitor; and wherein the drive signal applied to the motor is applied to the potentiometer and the astable multivibrator through the rectifying circuit.

9. A method for controlling the rotational position of a motor shaft associated with a motor positioned mechanism, the motor shaft being mounted on a motor, the method comprising the steps of:

applying a first drive signal to the motor such that the motor shaft is rotated;

detecting an absolute rotational position of the rotated motor shaft;

generating a position signal having a voltage level which is determined by the absolute rotational position;

converting the position signal into a pulse signal including at least one pulse having a duty ratio which is determined by the voltage level of the position signal;

comparing the duty ratio of the pulse signal with a predetermined value representing a predetermined rotational position of the motor shaft; and generating a second drive signal to the motor of the motor positioned mechanism until the duty ratio of the pulse signal coincides with the predetermined value.

* * * * *